United States Patent
Suyama et al.

(10) Patent No.: US 8,049,049 B2
(45) Date of Patent: Nov. 1, 2011

(54) METHOD OF UPGRADING BIOMASS, UPGRADED BIOMASS, BIOMASS WATER SLURRY AND METHOD OF PRODUCING SAME, UPGRADED BIOMASS GAS, AND METHOD OF GASIFYING BIOMASS

(75) Inventors: Chiaki Suyama, Yokohama (JP); Shinichi Tokuda, Yokohama (JP); Masao Tsurui, Higashi Ibaraki-gun (JP); Yoshinori Suto, Yokohama (JP); Koji Tamura, Higashi Ibaraki-gun (JP); Tsutomu Katagiri, Higashi Ibaraki-gun (JP); Teruo Nagai, Tokyo (JP); Jin Ogawa, Tokyo (JP); Takeshi Yamaguchi, Tokyo (JP)

(73) Assignees: JGC Corporation, Tokyo (JP); The Tokyo Electric Power Company, Incorporated, Tokyo (JP)

( * ) Notice: Subject to any disclaimer, the term of this patent is extended or adjusted under 35 U.S.C. 154(b) by 318 days.

(21) Appl. No.: 12/264,169

(22) Filed: Nov. 3, 2008

(65) Prior Publication Data
US 2009/0071616 A1    Mar. 19, 2009

Related U.S. Application Data

(62) Division of application No. 10/523,749, filed as application No. PCT/JP03/05362 on Apr. 25, 2003, now Pat. No. 7,465,844.

(30) Foreign Application Priority Data

Aug. 12, 2002  (JP) .................................. 2002-234987
Nov. 15, 2002  (JP) .................................. 2002-332190

(51) Int. Cl.
*C07C 1/00*   (2006.01)
*C10L 5/00*   (2006.01)
*C10B 53/08*  (2006.01)

(52) U.S. Cl. .............. 585/240; 585/242; 201/7; 201/42; 44/605

(58) Field of Classification Search .................. 585/240, 585/242; 201/7, 42; 44/605
See application file for complete search history.

(56) References Cited

U.S. PATENT DOCUMENTS

| | | | |
|---|---|---|---|
| 3,698,881 A | 10/1972 | White | |
| 4,500,041 A * | 2/1985 | Nakaoji et al. | ................... 241/16 |
| 5,685,153 A | 11/1997 | Dickinson et al. | |
| 6,180,845 B1 | 1/2001 | Catallo et al. | |

FOREIGN PATENT DOCUMENTS

| | | |
|---|---|---|
| JP | 2001-115174 | 4/2001 |
| JP | 2002-59118 | 2/2002 |
| JP | 2003-129069 A | 5/2003 |
| WO | WO 02/20699 * | 3/2002 |

OTHER PUBLICATIONS

Toshiro Minowa et al., "Biomass no Nenryoka Kaatsu Nessuich deno Biomass no Hanno", Kagaku to Kogyo, 1999 Nen, vol. 52, No. 5, pp. 613-615.
Satoshi Kumagai et al., 5-2. Kaatsu Nessui ni yori Seibun Benri Sareta Shokubutsu-Kai The Japan Institute of Energy Taikai Koen Yoshishu, 2001 Nen, pp. 313-316.
Yoshikazu Sugimoto et al., "Suichu Kanetsu Shori Shita Cellulose oyobu Akamatsu no Kagakyu Kozo" Journal of the Japan Institute of Energy, 1996 Nen, vol. 75, No. 9, pp. 829-838.

* cited by examiner

*Primary Examiner* — Walter Griffin
*Assistant Examiner* — Lessanework Seifu
(74) *Attorney, Agent, or Firm* — Leason Ellis LLP

(57) ABSTRACT

This method of upgrading a biomass comprises: an upgrading step for performing upgrading treatment of a cellulose based biomass with an oxygen/carbon atomic ratio of at least 0.5, in presence of water and under a pressure of at least saturated water vapor pressure, and reducing said oxygen/carbon atomic ratio of said biomass to no more than 0.38, and a separation step for separating an upgraded reactant obtained from said upgrading step into a solid component and a liquid component.

12 Claims, No Drawings

METHOD OF UPGRADING BIOMASS, UPGRADED BIOMASS, BIOMASS WATER SLURRY AND METHOD OF PRODUCING SAME, UPGRADED BIOMASS GAS, AND METHOD OF GASIFYING BIOMASS

CROSS REFERENCE TO PRIOR APPLICATIONS

The present application is a divisional of U.S. patent application Ser. No. 10/523,749, filed on Aug. 22, 2005 now U.S. Pat. No. 7,465,844, which is the U.S. National Phase of PCT/JP03/05362, filed on Apr. 25, 2003, which claims the benefit of Japanese Patent Application Serial No. 2002-234987, filed on Aug. 12, 2002 and Japanese Patent Application Serial No. 2002-332190, filed on Nov. 15, 2002, all of which are hereby incorporated by reference in their entireties.

TECHNICAL FIELD

The present invention relates to a method of upgrading a cellulose based biomass, a method of converting a cellulose based biomass into a slurry, and a method of gasifying upgraded biomass.

BACKGROUND ART

Slurries formed by crushing solid fuels such as coal and then adding water and additives are known as CWM or CWF (Coal Water Mixture/Coal Water Fuel), and are consequently attracting considerable attention as new fuels.

From the viewpoint of handling, a slurry fuel requires a viscosity of no more than 1,500 mPa·s (rotary viscometer, 25° C., shear rate value of 100 [1/sec], these settings also apply below). Furthermore, with the demand in recent years for higher heating values and higher combustion efficiency, heating values of at least 16.5 MJ/kg (4,000 kcal/kg) are required.

The increase in carbon dioxide gas emissions as a result of the huge consumption of fossil fuels is a significant cause of global warming, and is leading to increased pressure for reductions in carbon dioxide gas emissions. Biomass, including materials such as timber, is a non-fossil based renewable energy considered to produce zero carbon dioxide emissions, and because the ash content and the sulfur content are extremely low, the investment costs for combustion facilities can be reduced.

Timber thinnings, wood scraps from wood processing, prunings from roadside trees, bagasse, rice straw, and used paper are largely unused, and are either dumped or disposed of for a fee, and if these types of materials could be used as fuels, then it would enable effective use of unused organic resources. These unused organic resources are solids of a variety of different forms, and if these solids could be liquefied or converted to a slurry in a similar manner to coal, then a significant expansion in the range of possible uses could be expected.

With these circumstances in mind, at the 15th International Conference on Coal and Slurry Technology in 1990, the Energy and Environmental Research Center at the University of North Dakota reported the generation of a slurry fuel by hot water treatment of timber.

However, the solid fraction concentration of the slurry reported by the University of North Dakota was no more than a maximum of approximately 48 mass %, and slurries of higher concentrations could not be produced. At a solid fraction concentration of approximately 48 mass %, the heating value of the slurry is only approximately 3,400 kcal/kg. If an attempt is made to increase the solid fraction concentration in order to increase the heating value, then the slurry solidifies and cannot be handled as a slurry.

Gasification of these unused organic resources of biomass origin by partial oxidation reactions, and subsequent use as gas fuels or synthetic gases for chemical reactions is also being investigated.

In the case of a direct gasification of a biomass, if the reaction temperature is less than 800° C., then the quantities of tar, soot and char produced increase, and operation of the gasification furnace becomes difficult. As a result, the partial oxidation reaction temperature must be maintained at a high temperature of at least 800° C. In order to maintain the partial oxidation reaction temperature at a high temperature of at least 800° C., the quantity of oxygen supplied must be increased, and in such cases the usage efficiency of the coolant gas decreases. A further problem arose in that the concentration of $H_2$ and CO, which represent the active ingredients within the targeted product gas, also decreases.

Furthermore, in a method in which a raw material biomass is crushed to form chips, because the production of chips smaller than a certain size is impossible, performing the gasification reaction within a pressurized system was problematic. In addition, because the biomass cannot be reduced to small enough particles, the rate of the partial oxidation reaction by oxygen is slow.

DISCLOSURE OF INVENTION

The inventors of the present invention discovered that by using a cellulose based biomass with an original oxygen/carbon atomic ratio of at least 0.5 as a raw material, and then upgrading the biomass to reduce this oxygen/carbon atomic ratio to no more than 0.38, a fuel having a superior quality can be stably produced with a high heating value for the solid component of the upgraded reactant of at least 25.1 MJ/kg (6,000 kcal/kg).

A method of upgrading a biomass according to the present invention comprises an upgrading step for performing upgrading treatment of a cellulose based biomass with an oxygen/carbon atomic ratio of at least 0.5, in the presence of water and under a pressure of at least the saturated water vapor pressure, to reduce the oxygen/carbon atomic ratio to no more than 0.38, and a separation step for separating the upgraded reactant obtained from the upgrading step into a solid component and a liquid component. An upgraded biomass of the present invention is a biomass obtained via the above upgrading method.

From an upgraded biomass of the present invention, a biomass water slurry having a heating value which is adequate as an alternative fuel to heavy oil or coal can be easily produced with a high solid fraction concentration. The upgraded biomass can be used as a solid fuel in the same manner as coal without further upgrading process, and can also be used as a soil conditioner or an adsorbent.

A method of producing a biomass water slurry according to the present invention comprises an upgrading step for performing upgrading treatment of a cellulose based biomass raw material in the presence of water under a pressure of at least the saturated water vapor pressure, a separation step for separating the upgraded reactant obtained from the upgrading step into a solid component and a liquid component, a crushing step for crushing the solid component obtained from the separation step to an average particle size of no more than 30 μm using a crushing device, and a mixing step for adding additives, and where necessary water, to the solid component and then mixing. The crushing step and the mixing step may be conducted either simultaneously, or sequentially in the order described above.

According to a method of producing a biomass water slurry of the present invention, a slurry with a high solid fraction concentration and a heating value which is adequate as an alternative fuel to heavy oil or coal, which does not lose slurry characteristics even on long term storage, and with a viscosity which enables transportation by pipe can be produced with good stability using a cellulose based biomass, which conventionally has not been effectively utilized, as the raw material.

A biomass water slurry of the present invention comprises, as a solid fraction, at least 50 mass % of an upgraded biomass, which is produced by upgrading a cellulose based biomass raw material in the presence of water and under a pressure of at least the saturated water vapor pressure, and then crushing the product to an average particle size of no more than 30 μm.

A biomass water slurry of the present invention has a high solid fraction concentration, a heating value which is adequate as an alternative fuel to heavy oil or coal, and a viscosity which enables transportation by pipe. The slurry can be stored with good stability, and even if stored for extended periods, the solid fraction and liquid within the slurry will not separate.

A biomass water slurry of the present invention and a method of producing such a slurry can utilize, as a raw material, a biomass formed from cellulose products which are conventionally ineffectively used, including wood based biomass such as timber thinnings, wood scraps from wood processing such as sawdust, chips and mills ends, prunings from roadside trees, wood based waste from construction, bark, and driftwoods; biomass from grasses such as rice straw, wheat or barley straw and bagasse; as well as bamboo, bamboo grass, burdock and used paper. Accordingly, resources can be utilized more effectively, and non-fossil based renewable energy considered to produce zero carbon dioxide emissions can be obtained, providing an effective countermeasure against environmental problems such as increases in carbon dioxide gas emissions. Furthermore, because the ash content and the sulfur content are extremely low, the investment costs for combustion facilities can also be reduced.

In a method of gasifying an upgraded biomass of the present invention, an upgraded biomass is subjected to gasification treatment at a gasification temperature within a range from 800 to 1300° C. and a gasification pressure of 0.1 to 10 MPa, in the presence of a gasifying agent comprising 25 to 40% of the quantity of oxygen required for complete combustion, and a required quantity of steam. An upgraded biomass gas of the present invention is a gas obtained from the above gasification method comprising hydrogen and carbon monoxide as primary constituents.

The aforementioned gasification treatment refers to gasification by partial oxidation, which utilizes oxygen and steam as the gasifying agent, and restricts the quantity of oxygen supplied to approximately ¼ to ½.₅ the quantity required for complete combustion.

According to a gasification method of the present invention, the quantity of oxygen supplied during direct oxidation can be reduced in comparison with the case in which a raw biomass is directly gasified, and the efficiency of the coolant gas can be improved. In addition, the concentration of $H_2$ and CO, which represent the active ingredients within the gasified product which is generated, can also be increased.

BEST MODE FOR CARRYING OUT THE INVENTION

As follows is a description of preferred embodiments of the present invention. However, the present invention is in no way limited to the examples presented below, and for example, features from the examples may also be suitably combined.

Examples of suitable cellulose based biomass raw materials which can be used in the present invention include biomass from cellulose products, including wood based biomass such as timber thinnings, wood scraps from wood processing such as sawdust, chips and mills ends, prunings from roadside trees, wood based waste from construction, bark and driftwoods; biomass from grasses such as rice straw, wheat or barley straw and bagasse; as well as bamboo, bamboo grass, burdock and used paper. In addition, provided they incorporate sufficient cellulose to enable use as a raw material, sludge, animal dung, agricultural waste and urban waste can also be used. Of the above cellulose based biomass materials, wood based biomass is particularly preferred.

Prior to the upgrading process, the cellulose based biomass raw material is preferably shredded to produce particle fragments of no more than 50 mm, and even more preferably no more than 5 mm, and most preferably no more than 1 mm. When the shredded raw material is supplied into the upgrading process, the shredded raw material may be converted to a slurry in an aqueous medium such as water. However, there is no limitation in the method of introduction of the shredded raw material. The shredded raw material may be supplied directly into the upgrading process without converted into a slurry.

The upgrading step reduces the oxygen content of the cellulose based biomass raw material, and improves the heating value of the biomass as a fuel, and the upgrading treatment is performed in the presence of water, under a pressure of at least the saturated water vapor pressure, for a predetermined time period, and within a predetermined temperature range.

There are no particular restrictions on the treatment temperature in the upgrading process, although temperatures from 250 to 380° C. are preferred, and temperatures from 270 to 350° C. are even more desirable. There are no particular restrictions on the treatment pressure, although the pressure is preferably from 0.5 to 5 MPa higher, and even more preferably from 1 to 3 MPa higher, than the saturated water vapor pressure.

There are no particular restrictions on the treatment time, although time periods from 5 to 120 minutes are preferred, and time periods from 10 to 60 minutes are even more desirable. The treatment time relates to the treatment temperature, and as the treatment temperature increases, the treatment time can be shortened, whereas if the treatment temperature is low, then the treatment time should be lengthened.

The upgrading process may utilize a batch treatment using an autoclave, or a continuous reaction apparatus formed from either one, or two or more reaction zones. During the upgrading process, in order to ensure the temperature is maintained within the above range, the conditions within the apparatus must be maintained using pressurized hot water, and a pressure lowering system for cooling the apparatus and returning the pressure to normal pressure is also required.

The upgraded reactant obtained from the upgrading process is separated into a solid component and a liquid component in a separation process. The separation process may include not only the separation of the solid component from the liquid component, but where necessary also a drying treatment in those cases in which the water content of the solid component is high. The solid component is dewatered until the solid fraction concentration is at least 50 mass %, and even more preferably at least 70 mass %. The separated liquid component may be reused as the water required within the upgrading process.

The separation of the solid component and the liquid component within the separation process may utilize any type of apparatus typically used for separation, including a leaf filter, a filter press, a presser, a centrifugal filter, or a centrifugal separator. The separation may be performed at high temperature, provided handling is possible, but may also be conducted at room temperature. In those cases in which the degree of dewatering is insufficient, drying is performed via a heated drying method until the required solid fraction concentration is obtained.

Following removal of the liquid component in the separation process and dewatering to a predetermined solid fraction concentration, the solid component is then crushed with a crushing device to an average particle size of no more than 30 μm. Examples of suitable crushing devices include ball mills, rod mills, hammer mills, disc grinding type crushers, fluid energy mills, or combinations of two or more of the above devices. The crushing may utilize either dry crushing or wet crushing, although from the viewpoint of energy efficiency, wet crushing is preferred.

In order to manufacture a biomass water slurry of the present invention, the average particle size of the crushed product obtained from the solid component by the above separation process should be no more than 30 μm, and is preferably no more than 20 μm, and even more preferably no more than 15 μm, and most preferably no more than 10 μm. The average particle size refers to values measured using a microtrac (FSA model, manufactured by Nikkiso Co., Ltd.).

In those cases in which a crushed product with an average particle diameter of no more than 30 μm is produced via a one stage crushing treatment, the crushed product may be sent, as is, to the mixing process. In those cases in which one stage crushing does not produce an average particle diameter of no more than 30 μm, the crushed product can be re-crushed to reduce the average particle diameter to a value of no more than 30 μm. Re-crushing may be performed via a closed system in which sieving is conducted at a certain particle size, with undersize particles sent directly to the mixing step, and oversize coarse particles subjected to re-crushing.

Subsequently in the mixing process, additives, and where necessary water, are added to the crushed solid component, and mixing is performed, yielding a biomass water slurry. Examples of additives include anionic, cationic and nonionic surfactants, which can be used singularly, or in combinations of two or more additives. Appropriate additives are selected in accordance with the properties of the crushed solid matter.

Examples of suitable anionic surfactants which can be used include alkyl sulfate esters, higher alcohol sulfate esters, non-ionic ether sulfate esters, olefin sulfate esters, polyoxyethylene alkyl(alkylphenol) sulfate esters, alkylallyl sulfonates, dibasic ester sulfonates, alkylbenzene sulfonates, alkylnaphthalene sulfonates, dialkyl sulfosuccinates, alkyl phosphate esters, and acyl sarcosinates.

Examples of suitable cationic surfactants which can be used include alkyl amines, quaternary amines, and alkylpyridinium sulfates.

Examples of suitable nonionic surfactants which can be used include polyoxyalkyl ethers, polyoxyethylene alkylphenol ethers, oxyethylene oxypropylene block polymers, polyoxyethylene alklyamines, sorbitan fatty acid esters, polyoxyethylene sorbitan fatty acid esters, alkyltrimethylammonium chloride, alkyldimethylbenzylammonium chloride, polyoxyethylene fatty acid esters, aliphatic alcohol polyoxyethylene ethers, polyhydric alcohol fatty acid esters, and fatty acid ethanolamides.

Amphoteric surfactants such as alkyl betaines can also be used.

The net quantity of additives added is preferably no more than 1.0 mass %, and even more preferably no more than 0.1 mass %, relative to the crushed solid component. In those cases in which water is added together with the additives, then the additives can be added to the water to produce a predetermined additives concentration, and this mixture then mixed with the solid component. Alternatively, the water, the solid component, and the additives can all be combined simultaneously and then mixed. The mixer can utilize any form of mixer, although a mixer with a powerful mixing action is preferable.

The crushing process and the mixing process may comprise crushing of the solid fraction in the crushing process, followed by supply of the crushed solid matter to the mixing process, or alternatively the crushing process and the mixing process can also be conducted simultaneously.

For biomass water slurries obtained via the steps described above, because higher solid fraction concentration values produce high heating values, the concentration should be kept as high as possible. Solid fraction concentration values of at least 50 mass % are preferred, with concentration levels of at least 55 mass % even more preferred, and concentration levels of at least 60 mass % the most desirable.

On the other hand, in order to enable transportation of a biomass water slurry by pipe, the biomass water slurry should have a low viscosity of preferably no more than 1,500 mPa·s, and even more preferably no more than 1,000 mPa·s.

During conversion to a water slurry, by using an upgraded crushed biomass with a higher solid fraction concentration than is desirable for a biomass water slurry, and then mixing this upgraded crushed biomass while gradually adding either water containing additives, or additives and water separately, and then stopping the addition of water at the point the viscosity falls rapidly, excessive dilution of the upgraded biomass with water can be avoided, which is preferable.

A biomass water slurry obtained in the manner described above has a high solid fraction concentration, and a heating value which is adequate as an alternative fuel to heavy oil or coal, and in addition has a viscosity which makes pipe transportation possible. Furthermore, the slurry can be stored with good stability, and even if stored for extended periods, the solid fraction and the liquid within the slurry will not separate to a degree likely to cause operational problems.

This biomass water slurry is able to utilize, as a raw material, a biomass formed from cellulose products which are conventionally ineffectively used, including wood based biomass such as timber thinnings, wood scraps from wood processing such as sawdust, chips and mills ends, prunings from roadside trees, wood based waste from construction, bark and driftwoods; biomass from grasses such as rice straw, wheat or barley straw and bagasse; as well as used paper. Consequently, resources can be utilized more effectively, and because the slurry is a non-fossil based renewable energy considered to produce zero carbon dioxide emissions, it provides one effective countermeasure against environmental problems such as increases in carbon dioxide gas emissions. Furthermore, because the ash content and the sulfur content of this biomass water slurry are extremely low, the investment costs for combustion facilities can also be reduced.

A method of upgrading a biomass according to another embodiment of the present invention uses biomass raw materials such as those described above in which the oxygen/carbon atomic ratio within the raw materials is at least 0.5 in all cases. Examples include Japanese cedar with an oxygen/carbon atomic ratio of 0.620, pine with a ratio of 0.632, acacia with a ratio of 0.644, bamboo with a ratio of 0.693, and burdock with a ratio of 0.949. These oxygen/carbon atomic ratios are values obtained by measurements on dried samples using mass spectrometry, and although there is some variation, most values are substantially constant for each variety of plant. In comparison, the equivalent ratio for coal, although dependent on the type of coal, is typically from 0.1 to 0.3.

The cellulose based biomass raw material used in the upgrading process is shredded first, in the same manner as described above, and is preferably reduced to particle fragments of no more than 50 mm, and even more preferably no more than 5 mm, and most preferably no more than 1 mm.

In this method of upgrading a biomass, the oxygen/carbon atomic ratio of the cellulose based biomass raw material is reduced, and the heating value as a fuel is increased. Specifically, by conducting the upgrading treatment of a cellulose based biomass raw material with an oxygen/carbon atomic ratio of at least 0.5, in the presence of water, under a pressure of at least the saturated water vapor pressure, for a predetermined time period, and within a predetermined temperature range, the oxygen/carbon atomic ratio is reduced to no more than 0.38.

The quantity of water added to the cellulose based biomass raw material, including the existing water content within the cellulose based biomass raw material, is preferably within a range from approximately 1 to 20 fold the mass (dry base) of the cellulose based biomass raw material, with quantities from 5 to 15 fold being even more desirable. The water may utilize recirculated liquid separated from the upgraded reactant in the separation process described below.

The treatment temperature in the upgrading process is preferably within a range from 250 to 380° C., and even more preferably from 270 to 350° C. The operating pressure is preferably from 0.5 to 5 MPa higher, and even more preferably from 1 to 3 MPa higher, than the saturated water vapor pressure.

There are no particular restrictions on the treatment time in the upgrading process, although time periods from 5 to 120 minutes are preferred, and time periods from 10 to 60 minutes are even more desirable. As the treatment temperature increases, the treatment time can be shortened, whereas if the treatment temperature is low, then the treatment time should be lengthened.

The upgrading process may utilize a batch treatment using an autoclave, or a continuous reaction apparatus formed from either one, or two or more reaction zones. During the upgrading process, in order to ensure the temperature is maintained within the above range, the conditions within the apparatus must be maintained using pressurized hot water, and a pressure lowering system for cooling the apparatus and returning the pressure to normal pressure is also required.

The upgraded reactant obtained from the upgrading process is separated into a solid component and a liquid component in a separation process. The separation process of the present invention includes not only the separation of the solid component from the liquid component, but where necessary also a drying treatment using heated drying or the like, which is performed in those cases in which the water content of the solid component is high.

The solid component produced from the separation process is obtained as an upgraded biomass cake. The solid fraction concentration of this cake is preferably at least 50 mass %, and even more preferably at least 60 mass %. The liquid component separated during the separation process may be reused as the water required within the upgrading process.

The separation of the solid component and the liquid component within the separation process may utilize any type of apparatus typically used for separation, including a leaf filter, a filter press, a presser, a centrifugal filter, or a centrifugal separator. The separation may be performed at high temperature, provided handling is possible, but may also be conducted at room temperature.

The conditions within the upgrading process of the present invention, such as the upgrading temperature, pressure, and time period are suitably selected so as to achieve an upgraded reactant with an oxygen/carbon atomic ratio of no more than 0.38, and preferably no more than 0.3. Taking into consideration the energy efficiency during the upgrading process, the lower limit for the oxygen/carbon atomic ratio is approximately 0.1.

Comparing the oxygen/carbon atomic ratio in the biomass with the production of charcoal obtained by carbonization of timber, in the case of charcoal, the timber is baked at 400 to 1000° C. and undergoes thermal decomposition at a high temperature, and the product has a carbon content of greater than 90% and an oxygen content of almost 0, whereas in the present invention, upgrading treatment is performed in the presence of water, at a lower temperature and a higher pressure than that used in the charcoal baking, and a mild thermal decomposition process which partially deoxygenates the raw material produces an oxygen/carbon atomic ratio of no more than 0.38.

If the weight of the raw material timber is deemed 100, then the recovered weight in the case of charcoal is approximately 10 to 25%, whereas the recovered weight of upgraded reactant in the present invention is at least 40%, meaning the fuel recovery rate is high.

The solid component of the upgraded reactant obtained in the separation process following the upgrading treatment to reduce the oxygen/carbon atomic ratio to no more than 0.38 has a heating value per dried weight unit of at least 27 MJ/kg. Even if converted to a water slurry to form a slurry fuel as described below, this type of solid component still yields a high quality fuel with a heating value per dried weight unit of at least 16.5 MJ/kg (at least 4,000 kcal/kg). In other words, with this upgrading method, crushing of the upgraded product is simple, and an upgraded biomass can be produced which displays good affinity for water and can be converted to a high density water slurry fuel. In addition to slurry fuels, this upgraded biomass may also be combusted directly as a solid component, or can also be used as a high heating value fuel, and mixed with existing fuels such as coal and then combusted within a boiler.

The weight of the volatile component within the upgraded biomass is preferably at least 50%. The weight of the volatile component refers to the value measured in accordance with JIS M8812, and is the value obtained by subtracting the water content from the mass reduction ratio observed when a sample is heated for 7 minutes at 900° C. without any air contact. The larger the volatile component, the better the combustibility will become.

This upgraded biomass can be converted to a low viscosity slurry with a high solid fraction concentration, which is capable of pipe transportation, by adding additives, adding further water if necessary, and then crushing and mixing the mixture, for example. The solid fraction concentration is typically at least 50 mass %, and preferably at least 55 mass %, and even more preferably at least 60 mass %.

Examples of suitable additives include the anionic, cationic and nonionic surfactants described above, which can be used singularly, or in combinations of two or more additives, and can be selected in accordance with the properties of the crushed solid matter.

In this method, the net quantity of additives added is preferably no more than 1.0 mass %, and even more preferably no more than 0.1 mass %, relative to the solid component. In those cases in which water is added together with the additives, then in the same manner as described above, a mixture of the additives and water can be mixed with the solid component, or alternatively, the water, the solid component, and the additives can all be combined simultaneously and then mixed.

In the crushing of the upgraded biomass, crushing is conducted so that the average particle size of the upgraded biomass particles is preferably no more than 30 μm, and even more preferably no more than 20 μm, and most preferably no more than 15 μm. The average particle size refers to values measured using a microtrac (FSA model, manufactured by Nikkiso Co., Ltd.).

Examples of suitable crushing devices that can be used include ball mills, rod mills, hammer mills, disc grinding type crushers, fluid energy mills, or combinations of two or more of the above devices. The crushing may utilize either dry crushing or wet crushing, although from the viewpoint of energy efficiency, wet crushing is preferred.

Either one stage or multistage crushing can be used. In the case of multistage crushing, a closed system may be used in which the crushed product from the first stage is sieved at a certain particle size, and oversize coarse particles are subjected to re-crushing.

Mixing the crushed upgraded biomass enables the production of a biomass water slurry. The mixer can utilize any form of mixer, although a mixer with a powerful mixing action is preferable. The crushing process and the mixing process may comprise crushing of the solid fraction in the crushing process, followed by supply of the crushed solid matter to the mixing process, or alternatively the crushing process and the mixing process can also be conducted simultaneously. The slurry may be produced by only one of the crushing process and the mixing process.

During conversion to a biomass water slurry through mixing, by using an upgraded crushed biomass with a higher solid fraction concentration than is desirable for a biomass water slurry, and then mixing this upgraded crushed biomass while gradually adding either water containing additives, or additives and water separately, and then stopping the addition of water at the point the viscosity falls rapidly, excessive dilution of the upgraded biomass with water can be avoided, which is desirable.

A biomass water slurry obtained in the manner described above has a high solid fraction concentration, and a heating value which is adequate as an alternative fuel to heavy oil or coal, and also displays a viscosity which makes pipe transportation possible.

Because the upgraded biomass is subjected to upgrading treatment at a pressure of at least the saturated water vapor pressure, to generate an oxygen/carbon atomic ratio of no more than 0.38, the biomass contains no toxic bacteria, and is also quite porous, and consequently when mixed with soil, the biomass provides breeding sites for useful soil bacteria and also adsorbs harmful components within the soil, meaning the upgraded biomass is useful as a soil conditioner, and can also be used as an adsorbent.

In addition, because this biomass water slurry utilizes, as a raw material, a biomass formed from cellulose products which are conventionally ineffectively used, including wood based biomass such as timber thinnings, wood scraps from wood processing such as sawdust, chips and mills ends, prunings from roadside trees, wood based waste from construction, bark and driftwoods; biomass from grasses such as rice straw, wheat or barley straw and bagasse; as well as used paper, resources can be utilized more effectively, and a non-fossil based renewable energy considered to produce zero carbon dioxide emissions can be generated, providing one effective countermeasure against environmental problems such as increases in carbon dioxide gas emissions. Furthermore, because the ash content and the sulfur content of this biomass water slurry are extremely low, the investment costs for combustion facilities can also be reduced.

Next is a description of a method of gasifying an upgraded biomass.

In order to gasify an upgraded biomass obtained through the method described above, oxygen and steam are used as a gasifying agent. The quantity of oxygen is set at approximately ¼ to ½.5 the quantity required for complete combustion of the upgraded biomass. The quantity of oxygen required for gasification is related to the gasification temperature. Oxygen may be substituted with air. In this method, for a preset gasification temperature, gasification can be achieved with a smaller quantity of oxygen than the case in which a raw biomass is gasified.

There are no particular restrictions on the gasification temperature, provided the temperature is sufficient for gasification to occur, and in order to suppress the generation of tar and soot, the gasification temperature is typically set within a range from 800 to 1300° C., and preferably from 800 to 1200° C. There are no particular restrictions on the gasification pressure, and values from 0.1 to 10 MPa can be used. Taking into consideration treatment of the generated gas during later stages, it is preferable that the gasification is conducted at a high pressure of 0.5 to 10 MPa.

The quantity of steam supplied during the gasification treatment is preferably determined so that (supplied quantity of oxygen/2+quantity of oxygen within supplied steam+quantity of oxygen within raw material)/(quantity of carbon within raw material) [mol/mol]=2.0 to 6.0. In addition to oxygen and steam, other gasifying agents such as carbon dioxide may also be used where necessary.

The upgraded biomass used in the gasification may be a dried biomass, a biomass containing water, or a slurry produced by adding water. A powder or slurry of an upgraded biomass to which coal powder has been added may also be used.

The upgraded biomass is easier to crush than a raw biomass, and can also be placed under high pressure and supplied to a gasification reaction vessel, and is consequently a desirable raw material for obtaining a high pressure gasification product.

By using an upgraded biomass in the gasification process, the quantity of oxygen supplied can be reduced in comparison with the case in which a raw biomass is oxidized directly, and the efficiency of the coolant gas can be improved. In addition, the concentration of $H_2$ and CO, which represent the active ingredients within the gasified product which is generated, can also be improved.

Furthermore, if an upgraded biomass is used, then the reduction of the biomass to small particles by crushing can be achieved with greater reliability, direct gasification by a partial oxidation reaction can be performed efficiently, and the gasification reaction can be conducted easily at a high pressure.

Furthermore, gasification of biomass comprising wood or the like is usually achievable at low temperatures of approximately 800° C., but tar and carbon deposition cause a reduction in gasification rate, and have been reported to cause operational trouble (reference: Biomass Handbook, edited by the Japan Institute of Energy, 2002, p 95). In contrast, in a gasification method of the present invention, tar and soot deposition does not occur, and the reduction in efficiency and operational troubles described above do not arise.

EXAMPLES

Example 1

3,300 g of water was added to 350 g of dried *Acacia mangium* (timber) which had been shredded to particles of no more than 1 mm, and the mixture was then stirred. The thus obtained mixture was placed in a 10 liter autoclave, and upgrading treatment was performed by raising the temperature from room temperature to 330° C. over a 3 hour period, and adjusting the pressure to 15.6 MPa. This state was then maintained for 10 minutes, and the mixture was then cooled to 80° C. over a 3 hour period, to yield a black colored slurry. This slurry was filtered using a Nutsche filter, and the thus obtained solid component was dried, and yielded 158 g of a black colored powder.

50 g of this powder was crushed for 30 hours in a 1 liter ball mill, and 40 g of a fine powder was recovered. Measurement of the particle size distribution of this fine powder using a microtrac (FSA model, manufactured by Nikkiso Co., Ltd.) revealed an average particle size of 8.2 µm.

With 40 g of this fine powder being mixed, water containing 2 mass % of a surfactant (NSF, manufactured by Dai-Ichi Kogyo Seiyaku Co., Ltd.) was added gradually, and at the point the slurry viscosity fell rapidly, addition of the water was stopped, thereby yielding a high viscosity slurry. The solid fraction concentration of this slurry was 67 mass %, and the viscosity was 770 mPa·s. This slurry remained in a slurry state even after storage for 2 months at room temperature.

When this biomass water slurry was used as the fuel for a combustion test furnace for observing a droplet combustion process, it was evident that the fuel could be used as an adequate alternative fuel to heavy oil. Furthermore, in terms of the facts that the ash content was less than 1 mass %, and the sulfur content was essentially non-existent, the biomass water slurry was superior to heavy oil.

Example 2

With the exceptions of performing the upgrading treatment using 470 g of *Acacia mangium* which had been dried and shredded to particles of no more than 1 mm and 4,300 g of water, and adjusting the set temperature and set pressure for the upgrading treatment to 300° C. and 11 MPa respectively, a slurry was obtained in the same manner as the example 1. The average particle size of the fine powder following crushing with the ball mill was 10.3 µm.

The solid fraction concentration of the slurry obtained after mixing was 66 mass %, and the slurry viscosity was 830 mPa·s. This slurry remained in a slurry state even after storage for 2 months at room temperature. The characteristics of this slurry as a fuel were the same as those of the biomass water slurry of the example 1.

Example 3

With the exceptions of performing the upgrading treatment using 290 g of *Acacia mangium* which had been dried and shredded to particles of no more than 1 mm and 2,700 g of water, and adjusting the set temperature and set pressure for the upgrading treatment to 350° C. and 18.8 MPa respectively, a slurry was obtained in the same manner as the example 1. The average particle size of the fine powder following crushing with the ball mill was 9.5 µm.

The solid fraction concentration of the slurry obtained after mixing was 68.5 mass %, and the slurry viscosity was 990 mPa·s. This slurry remained in a slurry state even after storage for 2 months at room temperature.

Example 4

With the exceptions of performing the upgrading treatment using 430 g of Japanese cedar which had been dried and shredded to particles of no more than 1 mm and 3,600 g of water, and adjusting the set temperature and set pressure for the upgrading treatment to 270° C. and 14 MPa respectively, a slurry was obtained in the same manner as the example 1. The average particle size of the fine powder following crushing with the ball mill was 11.3 µm.

The solid fraction concentration of the slurry obtained after mixing was 67 mass %, and the slurry viscosity was 770 mPa·s. This slurry remained in a slurry state even after storage for 2 months at room temperature. The characteristics of this slurry as a fuel were the same as those of the biomass water slurry of the example 1.

Example 5

With the exceptions of performing the upgrading treatment using 460 g of *Acacia mangium* which had been dried and shredded to particles of no more than 1 mm, using 3,200 g of the liquid obtained by filtering the upgrading treatment slurries obtained in the example 2 and the example 3 instead of water, and adjusting the set temperature and set pressure for the upgrading treatment to 330° C. and 18 MPa respectively, a slurry was obtained in the same manner as the example 1. The average particle size of the fine powder following crushing with the ball mill was 11 µm.

The solid fraction concentration of the slurry obtained after mixing was 70 mass %, and the slurry viscosity was 1,100 mPa·s. This slurry remained in a slurry state even after storage for 2 months at room temperature.

Example 6

The upgrading treatment was performed using 470 g of dried *Acacia mangium* which had been shredded to particles of no more than 1 mm and 4,300 g of water, and with the set temperature and set pressure for the upgrading treatment set to 300° C. and 11 MPa respectively. Furthermore, with the exception of altering the time for which the set temperature was maintained to 60 minutes, a slurry was obtained in the same manner as the example 1. The upgrading treatment yielded 223 g of a black colored powder. The average particle size of the fine powder following crushing with a ball mill was 9.9 µm.

The solid fraction concentration of the slurry obtained after mixing was 70 mass %, and the slurry viscosity was 940 mPa·s. This slurry remained in a slurry state even after storage for 2 months at room temperature.

Comparative Example 1, Examples 7 to 9

With the exceptions of performing the upgrading treatment using 470 g of *Acacia mangium* which had been dried and shredded to particles of no more than 1 mm and 4,300 g of water, and adjusting the set temperature and set pressure for the upgrading treatment to 300° C. and 11 MPa respectively in the same manner as the example 2, a black colored powder was obtained in the same manner as the example 1. This was crushed finely with a ball mill, yielding separate 50 g samples of finely crushed powder after 4 hours (comparative example 1), after 8 hours (example 7), after 16 hours (example 8) and after 32 hours (example 9) respectively. The average particle sizes of each powder sample were 35.2, 25.6, 15.1 and 10.3 μm respectively.

The solid fraction concentrations of each sample when converted to a slurry under the same conditions were 47, 55, 60 and 66 mass % respectively, and in the slurry produced after 4 hours of crushing (comparative example 1), the solid settled out after a few days and the slurry state was lost. The other slurries (example 7 through example 9) all remained in a slurry state even after storage for 2 months at room temperature.

Example 10

9,000 g of water was added to 1,000 g of dried Japanese cedar timber which had been shredded to particles of no more than 1 mm, and the pressure of the stirred slurry was raised to 15 MPa using a pump. The slurry was then fed into an electrically heated reaction apparatus with a preheating section of internal diameter 8 mm, an upgrading section, and a cooling section, and was upgraded in the upgrading section at a temperature of 300° C. and with a residence time of 30 minutes. Then it was cooled to 90° C. by the cooling section, and was left to stand at normal pressure. The thus obtained slurry was filtered using a Nutsche filter, and the solid component was then dried, and yielded 420 g of a black colored powder. Drying treatment was conducted for 10 hours at 105° C., and the water content within the treated product was reduced to no more than 2 mass %.

Determination of the elemental composition of the dried powder using a CHN coder manufactured by Yanaco Corporation, revealed an oxygen/carbon atomic ratio of 0.258, and furthermore the high heating value (the heating value during combustion, including the heat of condensation of generated $H_2O$) was 29.9 MJ/kg (7,150 kcal/kg), and the volatile component was 60%. The oxygen/carbon atomic ratio of the raw material Japanese cedar was 0.620, the high heating value was 20.0 MJ/kg (4,780 kcal/kg); and the volatile component was 85%.

50 g of the black colored powder was crushed for 30 hours in a 1 liter ball mill, and 40 g of a fine powder was recovered. Measurement of the particle size distribution of this fine powder using a microtrac (FSA model, manufactured by Nikkiso Co., Ltd.) revealed an average particle size of 8.2 μm.

With 40 g of this fine powder being mixed, water containing 2 mass % of a surfactant (NSF, manufactured by Dai-Ichi Kogyo Seiyaku Co., Ltd.) was added gradually, and at the point the slurry viscosity fell rapidly, addition of the water was stopped, thereby yielding a high viscosity slurry. The solid fraction concentration of this slurry was 67 mass %, and the viscosity was 770 mPa·s.

When this biomass water slurry was used as the fuel for a combustion test furnace for observing a droplet combustion process, it was evident that the fuel could be used as an adequate alternative fuel to heavy oil. Furthermore, in terms of the facts that the ash content was less than 1 mass %, and the sulfur content was essentially non-existent, the biomass water slurry was superior to heavy oil.

Example 11

Using the same raw material and apparatus as the example 10, but with the exceptions of setting the raised pressure applied by the pump to 9 MPa, and setting the temperature of the upgrading section to 270° C., the raw material was upgraded, filtered and dried in the same manner as the example 10, and yielded a black colored powder. The oxygen/carbon atomic ratio of the thus obtained black colored powder was 0.262, the high heating value was 29.8 MJ/kg (7,120 kcal/kg), and the volatile component was 60%.

Example 12

Using the same raw material and apparatus as the example 10, but with the exceptions of setting the raised pressure applied by the pump to 7 MPa, and setting the temperature of the upgrading section to 250° C., the raw material was upgraded, filtered and dried in the same manner as the example 10, and yielded a black colored powder. The oxygen/carbon atomic ratio of the thus obtained black colored powder was 0.376, the high heating value was 27.0 MJ/kg (6,450 kcal/kg), and the volatile component was 68%.

Example 13

Using the same raw material and apparatus as the example 10, but with the exception of setting the residence time within the upgrading section to 5 minutes, the raw material was upgraded, filtered and dried in the same manner as the example 10, and yielded a black colored powder. The oxygen/carbon atomic ratio of the thus obtained black colored powder was 0.260, the high heating value was 29.7 MJ/kg (7,100 kcal/kg), and the volatile component was 74%.

Example 14

With the exception of replacing the Japanese cedar raw material with *Acacia mangium* (oxygen/carbon atomic ratio: 0.644, high heating value: 21.0 MJ/kg (5,020 kcal/kg), volatile component: 84%) which had been dried and shredded in the same manner, a black colored powder was obtained in the same manner as the example 10. The oxygen/carbon atomic ratio of the thus obtained black colored powder was 0.243, the high heating value was 30.0 MJ/kg (7,170 kcal/kg), and the volatile component was 60%.

Example 15

With the exceptions of replacing the Japanese cedar raw material with pine (oxygen/carbon atomic ratio: 0.632, high heating value: 21.0 MJ/kg (5,010 kcal/kg), volatile component: 84%) which had been dried and shredded in the same manner, setting the raised pressure applied by the pump to 10 MPa, and setting the temperature of the upgrading section to 270° C., a black colored powder was obtained in the same manner as the example 10. The oxygen/carbon atomic ratio of the thus obtained black colored powder was 0.230, the high heating value was 30.6 MJ/kg (7,300 kcal/kg), and the volatile component was 62%.

Example 16

With the exception of replacing the Japanese cedar raw material with bamboo (oxygen/carbon atomic ratio: 0.632, high heating value: 22.0 MJ/kg (5,250 kcal/kg), volatile component: 83%) which had been dried and shredded in the same manner, a black colored powder was obtained in the same manner as the example 10. The oxygen/carbon atomic ratio of the thus obtained black colored powder was 0.216, the high heating value was 30.9 MJ/kg (7,380 kcal/kg), and the volatile component was 61%.

Example 17

With the exception of replacing the Japanese cedar raw material with burdock (oxygen/carbon atomic ratio: 0.949, high heating value: 19.9 MJ/kg (4,760 kcal/kg), volatile component: 86%) which had been dried and shredded in the same manner, a black colored powder was obtained in the same manner as the example 10. The oxygen/carbon atomic ratio of the thus obtained black colored powder was 0.268, the high heating value was 29.6 MJ/kg (7,070 kcal/kg), and the volatile component was 59%.

Comparative Example 2

Using the same raw material and apparatus as the example 10, but with the exceptions of setting the raised pressure applied by the pump to 5 MPa, and setting the temperature of the upgrading section to 230° C., the raw material was upgraded, filtered and dried in the same manner as the example 10, and yielded a dark brown colored powder. The oxygen/carbon atomic ratio of the thus obtained powder was 0.496, the high heating value was 23.9 MJ/kg (5,700 kcal/kg), and the volatile component was 74%.

Comparative Example 3

Using the same raw material and apparatus as the example 10, but with the exceptions of setting the raised pressure applied by the pump to 3 MPa, and setting the temperature of the upgrading section to 200° C., the raw material was upgraded, filtered and dried in the same manner as the example 10, and yielded a brown colored powder. The oxygen/carbon atomic ratio of the thus obtained brown colored powder was 0.615, the high heating value was 20.1 MJ/kg (4,800 kcal/kg), and the volatile component was 84%.

Example 18

For a gasification reaction using oxygen blowing, in which the dried black colored powder obtained through the upgrading treatment of the example 10 (oxygen/carbon atomic ratio: 0.258, high heating value: 29.9 MJ/kg) was supplied at a rate of 1,466 kg/hr, the quantity of oxygen required to ensure a gasification reaction vessel temperature of 1,100° C., and the composition of the gas at that time, were determined by simulation calculations.

Steam was supplied so that (supplied quantity of oxygen/2+supplied quantity of steam+quantity of oxygen within raw material)/(quantity of carbon within raw material)=4.0 [mol/mol]. The results are shown in Table 1.

The quantity of oxygen required was 28.1 kg-mol/hr, the quantity of (CO+$H_2$) within the product gas was 130.2 kg-mol/hr, and the (CO+$H_2$) gas concentration referenced to the dry gas was 84.1%. Furthermore, the cool gas efficiency was 84.9%.

These simulation results are determined based on the product gas composition reaching a thermodynamic equilibrium within the reversible reaction equations of equation (1) and equation (2) shown below.

$$CH_4 + H_2O \leftrightarrow CO + 3H_2 \quad (1)$$

$$CO + H_2O \leftrightarrow CO_2 + H_2 \quad (2)$$

When an apparatus was assembled, and an actual test was performed, the results obtained were substantially the same as those of the simulation calculations. Because the gasification was conducted at approximately 1100° C., the production of carbon and tar is limited, and consequently these factors were ignored in the calculations.

Comparative Example 4

For a gasification reaction using oxygen blowing, in which dried Japanese cedar (oxygen/carbon atomic ratio: 0.620, high heating value: 20.0 MJ/kg) was supplied at a rate of 2,340 kg/hr, the quantity of oxygen required to ensure a gasification reaction vessel temperature of 1,100° C., and the composition of the gas at that time, were determined by simulation calculations.

Steam was supplied so that (supplied quantity of oxygen/2+supplied quantity of steam+quantity of oxygen within raw material)/(quantity of carbon within raw material)=4.0 [mol/mol]. The reason that the raw material quantity was set at 2,340 kg/hr was to ensure that the quantities of (CO+$H_2$) generated, which represent the active ingredients within the product gas, were the same as in the example 18. The results are shown in Table 1. The quantity of oxygen required was 39.7 kg-mol/hr, the quantity of (CO+$H_2$) within the product gas was 130.2 kg-mol/hr, the same as the example 18, but the (CO+$H_2$) gas concentration referenced to the dry gas was 77.8%. Furthermore, the cool gas efficiency was lower, at 79.3%.

TABLE 1

|  | Example 18 | Comparative Example 4 |
|---|---|---|
| Raw material | Dried upgraded material | Dried Japanese cedar |
| Setting of Conditions | C = 100 kgmol (atomic mol) | Quantity of (CO + $H_2$) generated set as for the example 18, quantity of $O_2$ for 1100° C. then calculated |
| Raw material supply rate [kg/hr] | 1466 | 2348 |
| Raw material heating value HHV [kcal/kg] | 7150 | 4730 |
| Oxygen supply rate [kg-mol/hr] | 28.1 | 39.7 |
| Ratio relative to oxygen quantity required for complete combustion [%] | 26.5 | 29.1 |
| Steam supply rate [kg-mol/hr] | 89.6 | 79.1 |
| Gasification pressure [MPa] | 70 | 70 |
| Gasification temperature (calculated) [° C.] | 1105 | 1102 |
| Product gas quantities [kg-mol/hr] CO | 60.9 | 62.9 |
| $H_2$ | 69.3 | 67.3 |
| $CO_2$ | 24.0 | 36.7 |
| $H_2O$ | 58.9 | 84.4 |
| $CH_4$ | 0.7 | 0.4 |
| Cool gas efficiency *) [%] | 84.9 | 79.3 |

*) Cool gas efficiency = HHV of combustible gas within product gas/HHV of gasified raw material, HHV: high heating value In an oxygen blowing gasification method, the quantity of oxygen used has a large effect on the economic viability, and from a comparison of the example 18 and the comparative example 4, it is evident that using the upgraded material as a raw material enables a reduction in the oxygen supply rate and an improvement in the cool gas efficiency over the case using a raw biomass. Furthermore, the concentration of the active ingredients within the product gas can also be improved.

INDUSTRIAL APPLICABILITY

According to the present invention, a slurry with a high solid fraction concentration and a heating value which is adequate as an alternative fuel to heavy oil or coal, which does not lose slurry characteristics even on long term storage, and with a viscosity which enables transportation by pipe, can be produced with good stability using a cellulose based biomass, which conventionally has not been effectively utilized, as the raw material.

The invention claimed is:

1. A method of producing a biomass water slurry, comprising:
   an upgrading step for performing an upgrading treatment of a cellulose based biomass raw material with an oxygen/carbon atomic ratio of at least 0.5, in the presence of water and under a pressure of at least saturated water vapor pressure, wherein the oxygen/carbon atomic ratio of said biomass raw material is reduced to a range of between 0.1 and 0.38,
   a separation step for separating an upgraded reactant obtained from said upgrading step into a solid component and a liquid component, and said solid component being dewatered until its concentration becomes at least 50 mass %,
   a crushing step for crushing said solid component obtained from said separation step to an average particle size of no more than 30 μm using a crushing device, and
   a mixing step for adding additives, and where necessary water, to said solid component, and mixing, wherein said crushing step and said mixing step are performed either simultaneously or sequentially in this order.

2. A method of producing a biomass water slurry according to claim 1, wherein said cellulose based biomass is a wood based biomass.

3. A method of producing a biomass water slurry according to claim 1, wherein an average particle size of a solid component crushed in said crushing step is no more than 20 μm.

4. A method of producing a biomass water slurry according to claim 1, wherein said upgrading treatment is conducted at a temperature of 250 to 380° C., for a period of 5 to 120 minutes.

5. A method of producing a biomass water slurry according to claim 1, wherein a solid fraction concentration of a biomass water slurry obtained from said mixing step is at least 50 mass %.

6. A method of producing a biomass water slurry according to claim 1, wherein a cellulose based biomass raw material used in said upgrading step has already undergone shredding.

7. A method of producing a biomass water slurry according to claim 6, wherein said shredded cellulose based biomass raw material is used in said upgrading step in a water slurry form.

8. A method of producing a biomass water slurry according to claim 1, wherein a solid component of a reactant obtained from the separation step has a heating value per dried weight unit of at least 27 MJ/kg.

9. A method of producing a biomass water slurry according to claim 1, wherein water and additives are either simultaneously or separately added to the solid component of the mixing step until a viscosity of a biomass water slurry obtained in the mixing step becomes 1,500 mPa·s or less.

10. A method of producing a biomass water slurry according to claim 1, wherein a biomass water slurry comprises at least 50 mass % of an upgraded biomass as a solid fraction, said upgraded biomass being produced by upgrading a cellulose based biomass in the presence of water and under a pressure of at least saturated water vapor pressure, and crushing to an average particle size of no more than 30 μm.

11. A method of producing a biomass water slurry according to claim 10, wherein the solid fraction concentration is from 55 to 75 mass %.

12. A method of producing a biomass water slurry according to claim 10, wherein an average particle size of a solid component in the solid fraction is no more than 20 μm.

* * * * *